C. W. BORING.
MEANS FOR COOLING THE VALVE CHESTS OF AIR COMPRESSORS.
APPLICATION FILED JUNE 5, 1913.
1,113,873.
Patented Oct. 13, 1914.
2 SHEETS—SHEET 1.
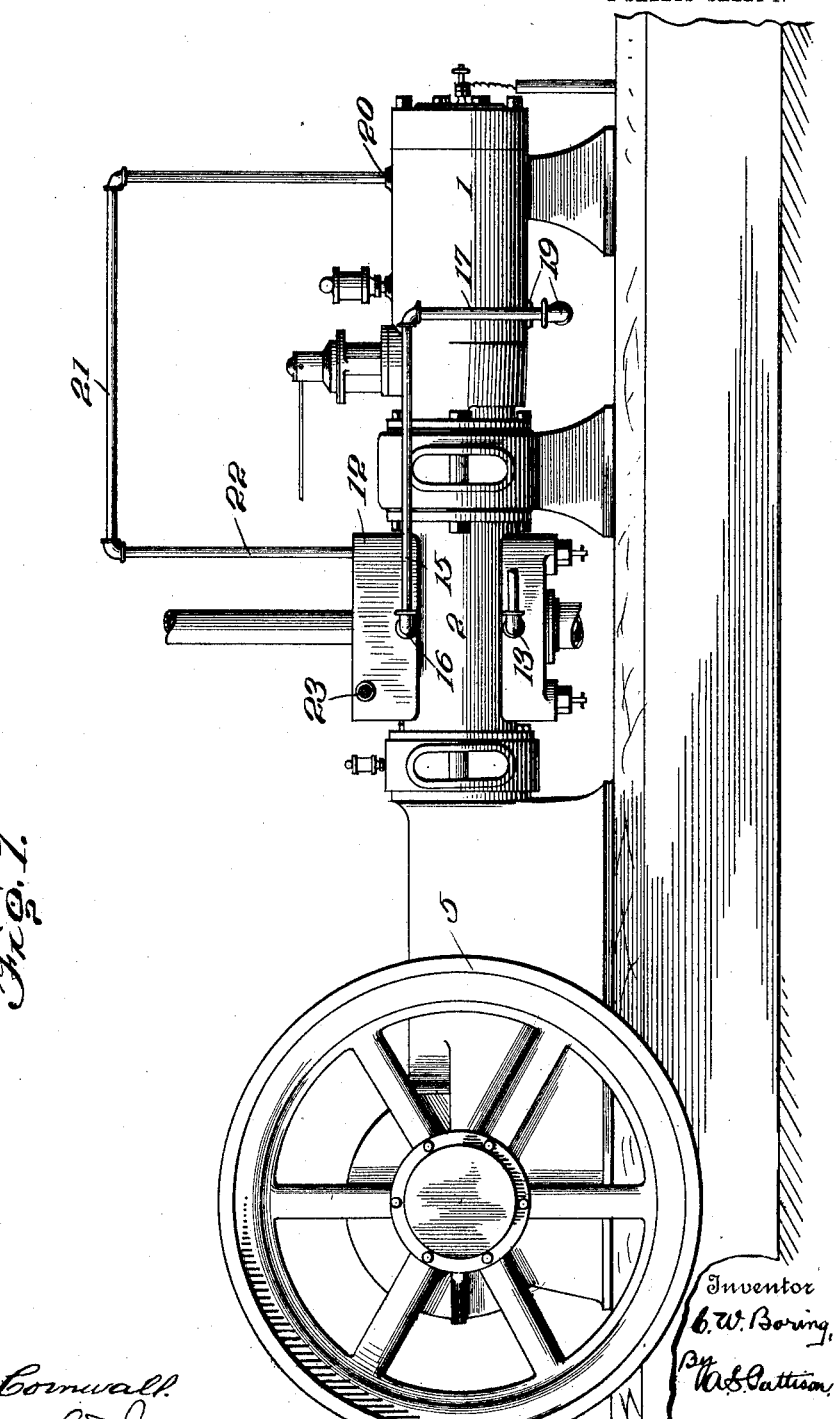

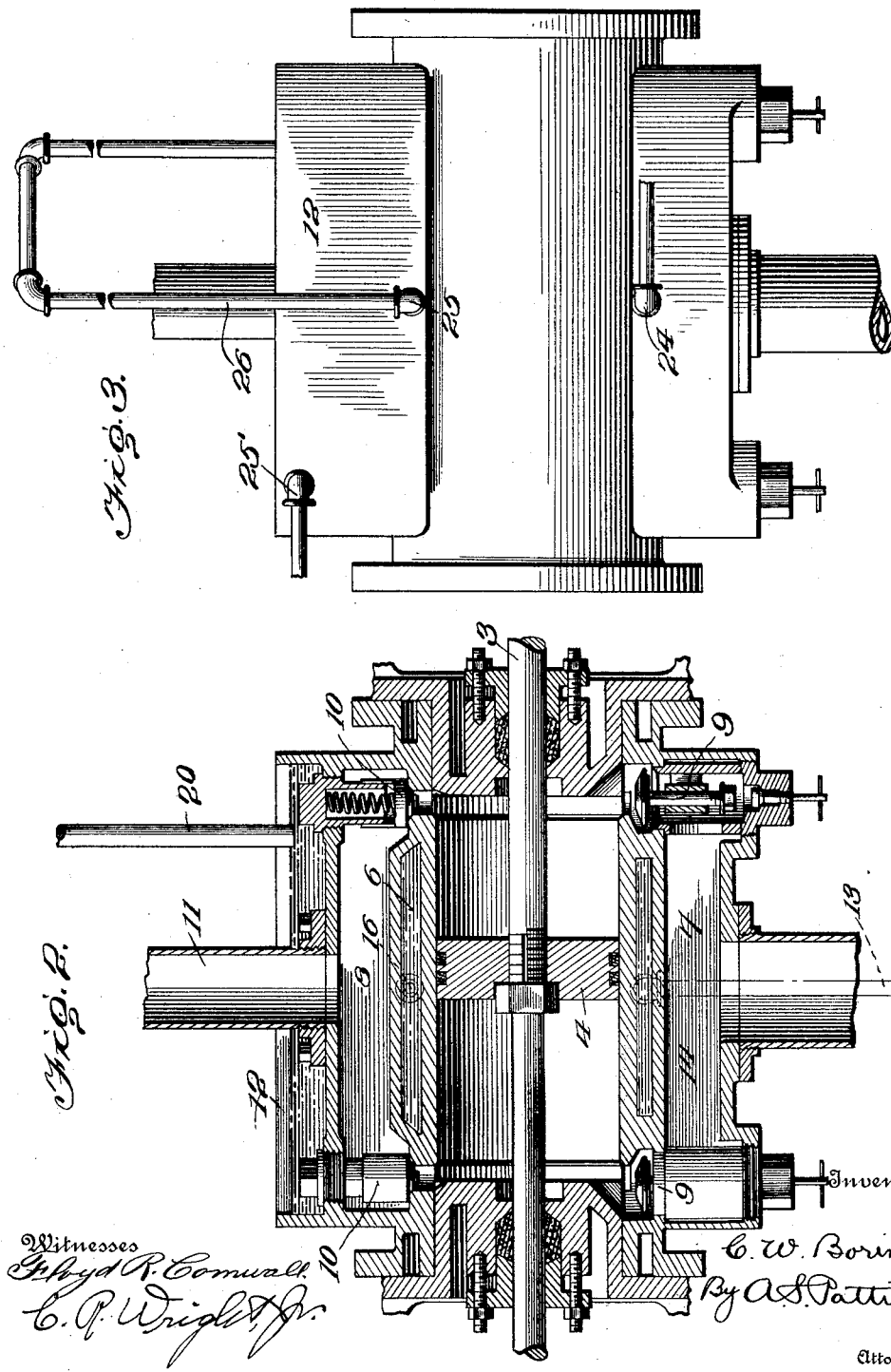
C. W. BORING.
MEANS FOR COOLING THE VALVE CHESTS OF AIR COMPRESSORS.
APPLICATION FILED JUNE 5, 1913.
1,113,873.  Patented Oct. 13, 1914.
2 SHEETS—SHEET 2.

UNITED STATES PATENT OFFICE.

CLEMENT W. BORING, OF BRADFORD, PENNSYLVANIA.

MEANS FOR COOLING THE VALVE-CHESTS OF AIR-COMPRESSORS.

1,113,873.  Specification of Letters Patent.  Patented Oct. 13, 1914.

Application filed June 5, 1913. Serial No. 771,993.

*To all whom it may concern:*

Be it known that I, CLEMENT W. BORING, a citizen of the United States, residing at Bradford, in the county of McKean and State of Pennsylvania, have invented certain new and useful Improvements in Means for Cooling the Valve-Chests of Air-Compressors, of which the following is a specification, reference being had therein to the accompanying drawing.

The object of my invention is to provide means whereby both the cylinder and discharge valve chest of air compressors may be readily cooled and prevent the same from being super-heated and carbonized by reasons of the oil and hot air generated by compression, as is the usual case in compressors.

Another object of my invention is to provide a simple, cheap and more effective cooling device of this character having certain details of structure hereinafter more fully set forth.

In the accompanying drawings Figure 1 is a side elevation of an air compressor embodying my invention, showing the compressor operated by a gas engine and the water cooling circulation in communication with the water-jacket of the gas engine. Fig. 2 is an enlarged vertical longitudinal sectional view of the compressing cylinder and valve chest showing the water receptacle surrounding the valve chest. Fig. 3 is a side elevation of an air compressing cylinder showing the water circulation connected directly thereto, which would be used in the event that the compressor is driven by a steam or electrical engine.

Referring now to the drawings: 1 represents a gas engine which is of the usual structure having in alinement therewith the air-compressing cylinder 2, and said gas engine carrying the piston-rod 3 carrying the air-compressing piston 4, within the cylinder 2. The said piston rod 3 extends out through the opposite end of the air-compressing cylinder and is connected to the flywheel 5 in any desired manner, all of which could be varied without departing from my invention.

The air compressing cylinder is provided with a water jacket 6, entirely surrounding the same between the air intake space 7 and the discharge space 8. The intake valves 9, at the lower end of the cylinder, do not need cooling as they are kept comparatively cool by the cold air that is drawn therethrough. The upper discharge valves 10 communicate with the discharge space 8, and said space has a discharge pipe 11 communicating with the center thereof. Above the space 8, I provide an open receptacle 12, surrounding the upper ends of the valves 10 and into which water is discharged continuously and kept at a pre-determined level, as will be hereinafter more fully described.

The water-jacket 6, surrounding the air-compressing cylinder 2, has communicating therewith at its lower end an inlet pipe 13, through which water is continuously forced under a solid pressure and whereby the space 6 is kept full of cool water. This inlet pipe 13 for the water is shown in dotted lines, Fig. 2. The water-jacket or space 6, at the upper end, has a pipe 15 communicating therewith at 16, Figs. 1 and 2, and said pipe extends along the side of the cylinder to a point midway the engine cylinder 1. The pipe 15 has a downwardly extending portion 17, which turns inwardly under the cylinder 1, and is connected to the water-jacket 19 of the engine cylinder 1. The said water-jacket of the engine cylinder has at its rear end a discharge pipe 20, which extends upwardly and forwardly at 21 and downwardly at 22 terminating in the water receptacle 12 a slight distance below the upper end thereof. From this structure it will be seen that the water enters the air compressing cylinder 2 at 13, encircling the cylinder and passing outwardly at 16 into the pipe 15, and then is carried forward to the lower end of the gas engine cylinder 1, and communicates with the water-jacket thereof. The water encircles the engine cylinder and is discharged through the pipe 20 and passes through the pipes 21 and 22 and is discharged into the open water receptacle 12. The water as it passes into the receptacle is somewhat heated, but is sufficiently cool to keep the discharge valves 10 comparatively cool, and the water in the receptacle being open to the atmosphere, it will be seen that the same more readily cools and could not be heated to any great extent. The water receptacle 12 is provided with an overflow discharge 23, whereby the water is discharged from the receptacle and maintained at a level with the said discharge pipe. The receptacle 10, as heretofore stated, completely covers the upper ends of the air discharge space 8, and also all the valves 10 and necessarily keeps the same at a comparatively low temperature.

In the modification shown in Fig. 3, when a steam engine or electric motor is used, the water enters the water-jacket, or space 6, at 24, the same as in Fig. 1 and is discharged from the said water-jacket or space 6 at 25 and the pipe 26 communicates therewith and conveys the water upwardly and downwardly into the water receptacle 12, in the same manner as it is passed from the engine cylinder of the form shown in Fig. 1. In Fig. 3, the discharge pipe 25 is arranged the same as in Fig. 1, to maintain the water at a pre-determined level in the receptacle 12.

It might be found necessary in order to keep the valves 10 at the proper temperature, that the form shown in Fig. 3 would have to be used where a gas engine is employed as the motive power, and in such an event, the gas engine would have its separate water-cooling system, independent of the cooling system of the compressing cylinder.

Having thus described my invention, what I claim and desire to secure by Letters Patent is:

1. The combination with an air compressor having a water-jacket surrounding the same and an open receptacle above and surrounding the air discharge valves, a gas engine for driving the compressor piston, a water-supply for the lower end of the water-jacket, a discharge for the upper end of the water-jacket and connected to the water-jacket of the gas engine, and a water discharge for the water-jacket of the gas engine and discharging into the open receptacle.

2. The combination with an air-compressor cylinder and its piston, a water jacket surrounding the compressor cylinder, a water cooled gas engine operating the compressing piston, a water-supply for the lower end of the water jacket of the compressor, a discharge for the upper end of the water-jacket, said discharge connected to the water-jacket of the gas engine, a discharge for the water-jacket of the gas engine and communicating with the open receptacle and an overflow pipe for the said open receptacle.

3. The combination with an air compressor and its piston, a water-jacket surrounding the said cylinder, a gas engine operating the air compressing piston, a water supply for the lower end of the water-jacket of the compressing cylinder, a discharge for the upper end of the water-jacket and extending along the sides of the cylinders and downwardly and connected to the lower end of the water-jacket of the engine cylinder, a discharge for the upper end of the water-jacket of the engine-cylinder and extending upwardly, forwardly and downwardly into the open receptacle, and a water discharge for said open receptacle.

4. The combination with an air compressor and its piston, a water jacket surrounding the said compressor cylinder, a gas engine operating air compressing piston, a water supply for the lower end of the water jacket of the compressing cylinder, a discharge for the upper end of the water jacket of said compressing cylinder, and extending horizontally along the sides of the cylinder, and turned downwardly and connected to the lower end of the water jacket of the engine cylinder adjacent or nearest the compressing cylinder, a discharge for the upper end of the water jacket of the engine cylinder at the opposite end from the entrance of the water, and an open receptacle above and surrounding the air valves of the compressing cylinder, and into which the discharge of the engine cylinder passes, and said open receptacle having a discharge at its upper end to maintain a predetermined water level in the receptacle.

In testimony whereof I hereunto affix my signature in the presence of two witnesses.

CLEMENT W. BORING.

Witnesses:
HERMAN H. NORTH,
KATHARINE BURKE.

---

Copies of this patent may be obtained for five cents each, by addressing the "Commissioner of Patents, Washington, D. C."